(12) United States Patent
Flaming et al.

(10) Patent No.: US 8,733,978 B2
(45) Date of Patent: May 27, 2014

(54) OPTICAL FILTER SYSTEM AND METHOD

(75) Inventors: Dale G. Flaming, San Rafael, CA (US); Jack H. Belgum, San Anselmo, CA (US)

(73) Assignee: Sutter Instrument Company, Novato, CA (US)

( * ) Notice: Subject to any disclaimer, the term of this patent is extended or adjusted under 35 U.S.C. 154(b) by 304 days.

(21) Appl. No.: 13/162,904

(22) Filed: Jun. 17, 2011

(65) Prior Publication Data

US 2012/0320578 A1 Dec. 20, 2012

(51) Int. Cl.
*F21V 9/00* (2006.01)

(52) U.S. Cl.
USPC ............ 362/293; 362/282; 362/235; 359/889

(58) Field of Classification Search
USPC ......... 362/235, 282, 283, 277, 268, 322, 319, 362/2, 236, 293, 583, 510; 359/889
See application file for complete search history.

(56) References Cited

U.S. PATENT DOCUMENTS

| | | | | |
|---|---|---|---|---|
| 4,800,474 A | * | 1/1989 | Bornhorst | 362/293 |
| 5,084,807 A | * | 1/1992 | McKechnie et al. | 362/228 |
| 5,188,452 A | * | 2/1993 | Ryan | 362/293 |
| 6,042,249 A | * | 3/2000 | Spangenberg | 362/259 |
| 6,196,699 B1 | * | 3/2001 | Stanton | 362/235 |
| 6,832,839 B2 | * | 12/2004 | Childers et al. | 353/122 |

* cited by examiner

*Primary Examiner* — Bao Q Truong
(74) *Attorney, Agent, or Firm* — Kilpatrick Townsend & Stockton LLP

(57) ABSTRACT

An optical system and method for illuminating an object under investigation with filtered light is disclosed. In one embodiment, the system comprises a filter wheel having a plurality of variable bandpass filters. The filter wheel is rotatable about two axis, whereby rotation about the first axis brings a selected filter in line with a collimated beam of white light and rotation about the second axis adjusts the angle of the filter relative to the light beam in order to adjust the bandpass frequencies. A second beam of white light, which may be from a second light source, can also be reflected off of the face of the filter in a manner that illuminates the object with substantially white light. In one embodiment, the object may be alternately or simultaneously illuminated with filtered light or with reflected white light. The filter can be used as a bandstop or band rejection filter to illuminate the object with white light that is missing a narrow frequency band.

15 Claims, 5 Drawing Sheets

OPTICAL FILTER SYSTEM AND METHOD

FIELD OF THE INVENTION

The present invention relates to an optical filtering system and method, and particularly relates to a system and method for illuminating an object of interest with light passed through a user selected filter, or with white light, as desired by the user.

BACKGROUND

In scientific research, as well as in other applications, it is often desired to illuminate an object of interest, such as a biological specimen, with filtered light. As a simple example, a specimen may be dyed with a florescent substance or marker, and illuminated by light of a particular wavelength to effectuate the desired florescence. The use of interference gratings that allow only transmission of a very narrow band of light wavelengths is a well known method of providing filtered light. Such a filter may sometimes be referred to as a bandpass filter. Typically, white light is filtered to produce the desired wavelength for illuminating the object under investigation. As used herein, the term "light" is intended to have broad meaning and to encompass not only visible light but also infrared and ultraviolet light subject to filtering. Further, as used herein, the term white light is intended to have broad meaning.

In many research applications, the object under investigation is very small, such that a microscope is necessary to conduct the desired experimentation. In such cases, and in others, space is at a premium and it is desirable to make the various hardware systems used to conduct the investigation as compact as possible. Such hardware systems may include, for example, optical systems for illuminating a specimen with filtered light, mechanical systems such as micromanipulators and the like to position the specimen, microscopy systems and probe systems for observing and making measurements of the specimen, recording systems for acquiring data and images, and control systems for operating and coordinating the hardware.

Filter wheels useful in such applications, and others, are well known. Basically, a filter wheel comprises a plurality of optical filters mounted on a disc-shaped "wheel" that is rotatable about a central axis. By rotating the wheel any of the filters can be positioned by the user in the light path, thereby allowing the user to select (from among the filters) the wavelength of light used to illuminate the specimen. Such filters wheels are available, for example, from Sutter Instrument Company of Novato, Calif., (www.sutter.com) assignee of the present invention.

It is known that the bandpass frequencies of an optical interference filter shifts as a function of the angle of incidence of the light directed onto the filter. Recently, interference filters have been developed taking advantage of this property over a broad range of angles without substantial loss of the desired bandpass properties. Hence, these newly developed filters are "tunable" over a substantial range of wavelengths by changing the angle of incident light. Such filters remain useful at angles of up to 60 degrees relative to the light path. Recently, the assignee of the present invention has developed a filter wheel incorporating such filters, wherein at least one, and preferable all, of the filters on the wheel are tunable. In the embodiment that has been developed, the filter wheel is rotatable about two axes, namely, a first axis that is perpendicular to the center of the wheel (as in past filter wheels), and a second axis that is in the same plane as the wheel disk and runs through the center of the disk. This second axis allows adjustment of the bandpass frequencies, in the manner described, by allowing the filter to be rotated relative to the incident light.

In many research applications, it is beneficial to be able to shine both filtered light and white light onto the object under investigation. For example, filtered light may be used, as described, to cause florescence at a specific frequency, and white light may be used to facilitate manipulation, preparation or handling of the object under investigation, or of hardware, such as a microelectrode, that is associated with the investigation. As noted above, however, the space used for the investigation may be very limited, and use of multiple light sources may be difficult or impossible due to space limitations. Likewise, in order to enable an experiment to proceed efficiently, it may be desirable to quickly switch between white and filtered light.

SUMMARY OF THE INVENTION

Accordingly, an embodiment of the present invention is directed to an optical system having a filter wheel rotatable about at least two axes and having a plurality of optical filters coupled thereto, at least one of the filters having a transmission band that varies with the angle of light incident on the filter, a first optical subsystem defining a first light path and arranged such that a beam of light from a first broadband light source passes through a selected one of said plurality of filters at a selected angle of incidence and the filtered light is directed to an object, a second optical subsystem defining a second light path and arranged such that light from a second broadband light source reflects off of a surface of said selected one of said plurality of filters and the reflected light is directed to said object, a control system for rotating said filter wheel about each of said at least two axes, and for controlling said first and second light sources, whereby a user can select to have said object illuminated by said filtered light or by said reflected light, or by both. The first and second broadband light sources can either be the same or different. The first and second light paths may utilize the same filter angle, such that the object can be illuminated by transmitted filtered light or reflected light from said first and second light sources, respectively, without rotating the filter. The first and second optical subsystems can be configured such that the reflected light is missing a frequency band that is substantially the same as the frequency band of the filtered light, whereby the object can be alternately illuminated by light within and outside of said frequency band. Each of the plurality of optical filters may have an elongate shape. It is contemplated that the light beam is an inch or more in diameter.

In another aspect the present invention comprises a method of illuminating an object, including the steps of collimating light from a first light source to form a beam, rotating a filter wheel having a plurality of filters coupled thereto about a first axis such that the collimated light beam passes through a selected one of said filters to illuminate an object with filtered light, the selected filter having a transmission band that depends on the angle of the light beam incident on said selected filter, rotating the selected filter about a second axis to adjust the transmission band of said incident collimated light beam, such that filtered light illuminates the object, reflecting light off of a surface of said selected filter such that said reflected light illuminates the object. The reflected light may originate from a second light source or from the first light source. The method of claim 7 wherein the angle of the selected filter may be changed when the filter is used to provide reflected light or may be held constant when the filter is used to provide reflected light. The reflected light may be missing a frequency band that is substantially the same as the frequency band of the filtered light. The object may be simultaneously illuminated by filtered light and reflected light, such that no frequency band is missing from the illumination. Preferably, the steps are performed by a control system based on user inputs.

In another aspect the present invention comprises an optical system having a broadband light source for providing a beam of collimated light, at least one rotatable optical filter having a bandpass that varies over a broad range as a function of the angle of the light beam incident on the filter, such that said filter has a range of bandpass frequencies, a first optical subsystem for illuminating an object with filtered light have a selected bandpass, and a second optical subsystem for illuminating the object with light reflected off of said filter. The reflected light may originate from the same broadband light source or from a second broadband light source. The filter may be mounted on a filter wheel comprising a plurality of filters, and the plurality of filters may comprise at least five filters which provide a continuous range of bandpass frequencies.

DETAILED DESCRIPTION

Figure 1:
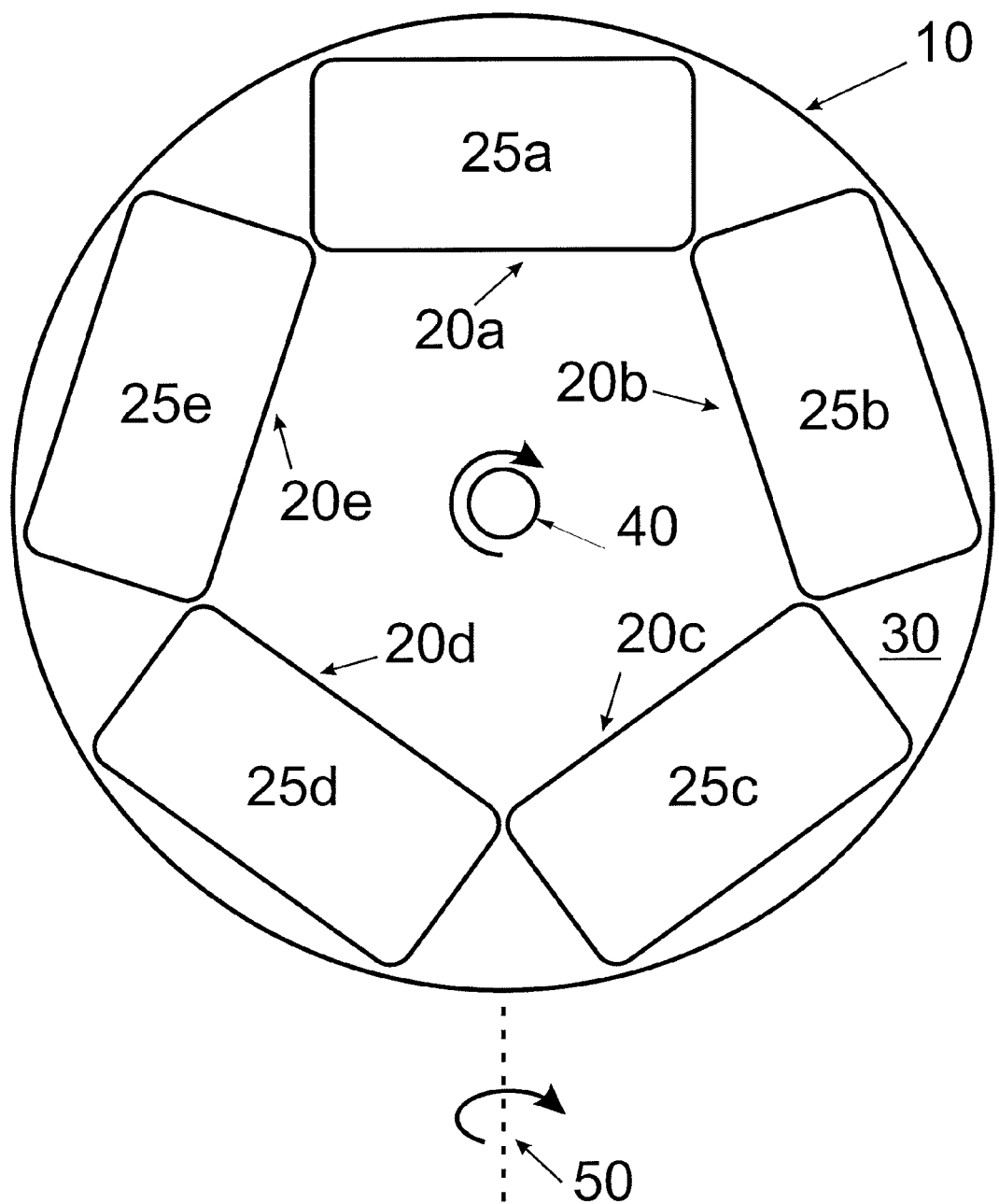
FIG. 1 is a representation of a filter wheel of the type used in an embodiment of the present invention.

FIG. 1 is a somewhat schematic diagram of a filter wheel 10 of the type that may be used in an embodiment of the present invention. Filter wheel 10 comprises a plurality of optical bandpass filters 25a-25e, mounted at a corresponding plurality of filter positions 20a-20e on disk 30. Collectively and generically these filter positions and filters will be referred to as filter positions 20 and filters 25, respectively. Although five filters positions 20, comprising apertures in disk 30, are shown in FIG. 1, the number of filter positions 20 on filter wheel 10 is a matter of design choice. It is noted that filters 25 are elongated because the filter in use may be rotated to a sharp angle relative to the light beam, which may have a diameter of an inch or more. In prior art filter wheels, such as those made by the assignee of the present invention, the apertures for mounting filters was typically round.

The need for elongate filters places further restrictions on the number of filters than can be mounted on a wheel of a given diameter. In practice, five filter positions is believed to be a good trade-off between the competing needs, on one hand, of keeping the filter wheel assembly reasonably compact, while, on the other hand, making it large enough to provide the user with a reasonable number of filter options. Filters 25 may be user selectable and user mountable at filter positions 20, but according to the present invention, at least one of, and preferable all of, filters 25 are of the type that has a bandpass that varies as a function of its angle relative to the incident light. In one embodiment, the filters are selected to provide a continuous range of bandpass frequencies.

Filter wheel 10 is rotatable about two axes, namely, a first central axis 40, which allows disk 30 to be rotated so as to bring a selected one of filters 25 into a light path (not shown in FIG. 1) passing through the selected filter, and a second axis 50 perpendicular to and passing through central axis 40, which allows the angle of the filter wheel to be adjusted relative to the light path. For convenience in this description, the light path is described as passing through the uppermost filter 25a, although those skilled in the art will appreciate that this is a matter of design choice. Thus, the bandpass of variable optical bandpass filter 25a is adjustable by rotation of filter wheel 10 about second axis 50. Rotation of filter wheel 10 about axes 40 and 50 may be actuated by stepper motors (not shown) so as to allow precise positioning and control.

Figure 2:
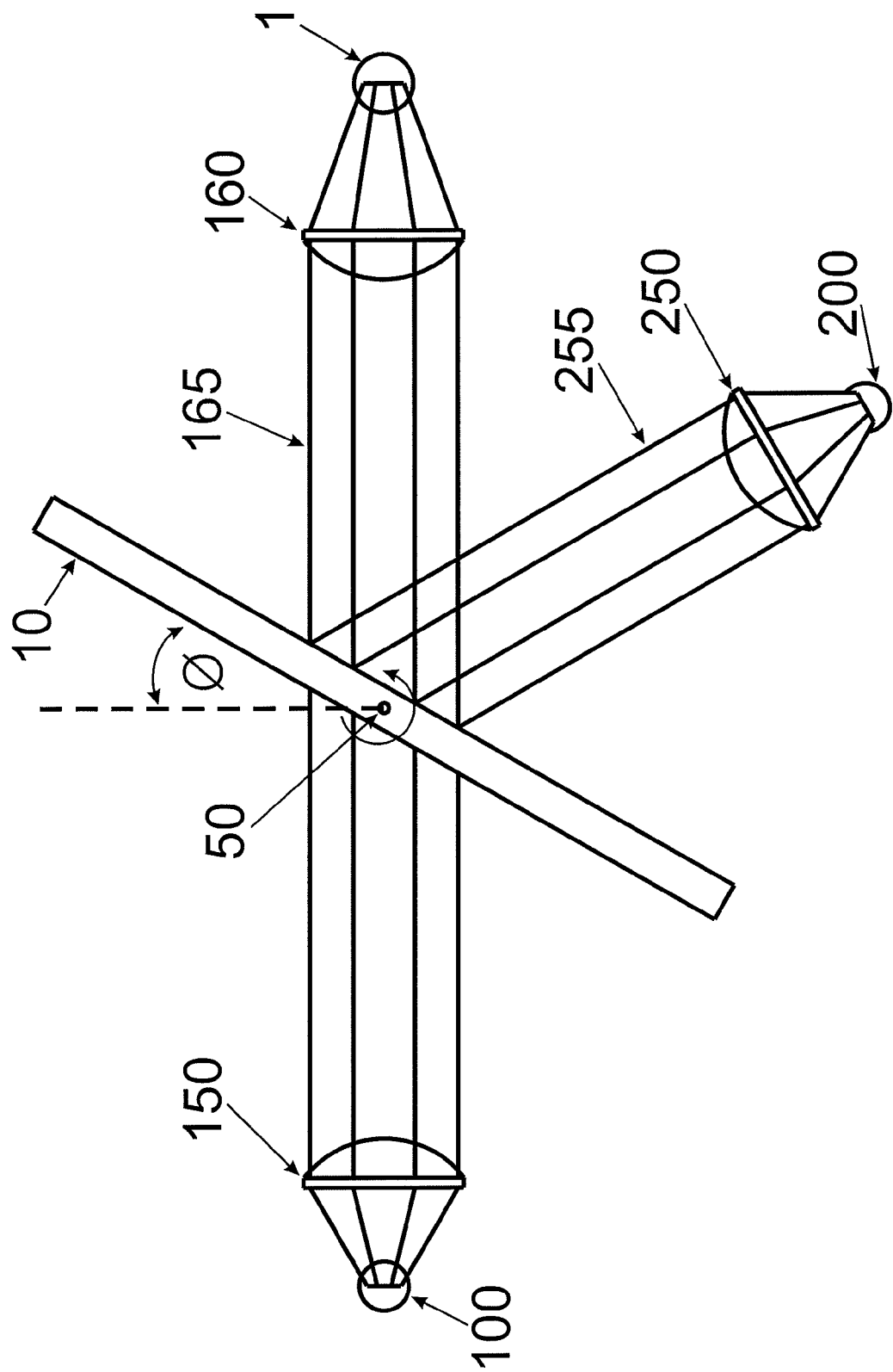
FIG. 2 is a schematic diagram of an embodiment of the present invention.

FIG. 2 is a schematic diagram of an embodiment of the present invention, showing the light paths used to illuminate an object 1 under investigation. Light from a first broadband light source 100 is collimated by collimating system 150 and the collimated light 155 is directed to a selected filter 25a (not shown in FIG. 2) on filter wheel 10. Preferably, first light source emits "white" light over a substantially continuous range of frequencies of interest. As noted above, the term "light" as used herein is intended to have broad meaning, including, for example, light in the ultraviolet and infrared in addition to light which is visible to the human eye.

As depicted, filter wheel 10 has been rotated about axis 50 by an angle $\theta$, relative to its home position 210 perpendicular to the collimated light 150, in order to adjust the bandpass of filter 25a according to the user's need. Filtered light 165 is then focused on object 1 by focusing system 160, thereby illuminating it with light having a narrow range of wavelengths determined by the filter characteristics and angle $\theta$. Such filtered light may be used, for example, to cause a chemical in or on the object to fluoresce. However, there is no intention to limit the present invention to any particular use regarding the nature of the object under investigation or the purpose of illuminating it with filtered light.

Researchers conducting experiments using filtered light sometimes find the need to illuminate the object under investigation with white light. For example, and without any intent to limit the scope of the present invention, it may be desirable to illuminate the object with white light while it is being positioned, manipulated, probed, dyed, photographed or otherwise worked upon or observed. In many cases, white light is more suitable for these operations because it enhances the visibility of the object or of the work area. As shown in FIG. 2, an embodiment of the present invention comprises a second broadband light source 200 for this purpose. Light from second light source 200 is collimated by collimating system 250 and the collimated light 255 is directed to filter 25a on filter wheel 10. A property of optical bandpass filters is that they will reflect light that is outside of the bandpass range. Accordingly, substantially all of the collimated white light 255 from second light source 200 will be reflected off of the surface of the filter and focused on object 1 by focusing system 160.

While collimating and focusing systems are depicted in FIG. 2 schematically as simple lenses, many optical components and combinations of components are known to those skilled in the art for collimating and focusing light, and the selection of optical elements for systems 150, 160 and 250 is a matter of design choice. Likewise, a variety of suitable light sources are known in the art and may be used in connection with the present invention. In one embodiment of the present invention, one or both of the light sources are provided by the user rather than being integrated into the filter wheel assembly.

Collimated light 250 must be reflected off of the filter at the correct angle in order for it to reach focusing system 160 and, thereafter, object 1. In one embodiment, second white light source and the path of collimated light 255 are fixed, and the angle θ is adjusted to a predetermined position when the user selects to illuminate object 1 with white light. The predetermined value of θ is selected to cause the filter to reflect light to object 1 through focusing system 160. Thus, for example, if collimated light 255 is at an angle of 60 degrees relative to the line defined by light source 100 and object 1, then setting θ at 30 degrees will provide the correct angle of reflection. In this embodiment, the value of θ will change depending on whether the user wants object 1 to be illuminated by white light or filtered light; in other words the filter wheel will be rotated about axis 50 by different amounts.

In an alternate, more complex embodiment, the angle of incidence of collimated white light 255 from light source 200 can be adjusted independently of the filter wheel, such the light can be reflected off of filter 25a without the need to rotate the filter wheel about axis 50 into a different position for this purpose. Thus, in this embodiment filtered light from source 100 and white light from source 200 can be used to alternately or simultaneously illuminate object 1 by turning one or the other or both of the light sources on, without need to change the position of the filter wheel.

Figure 3:
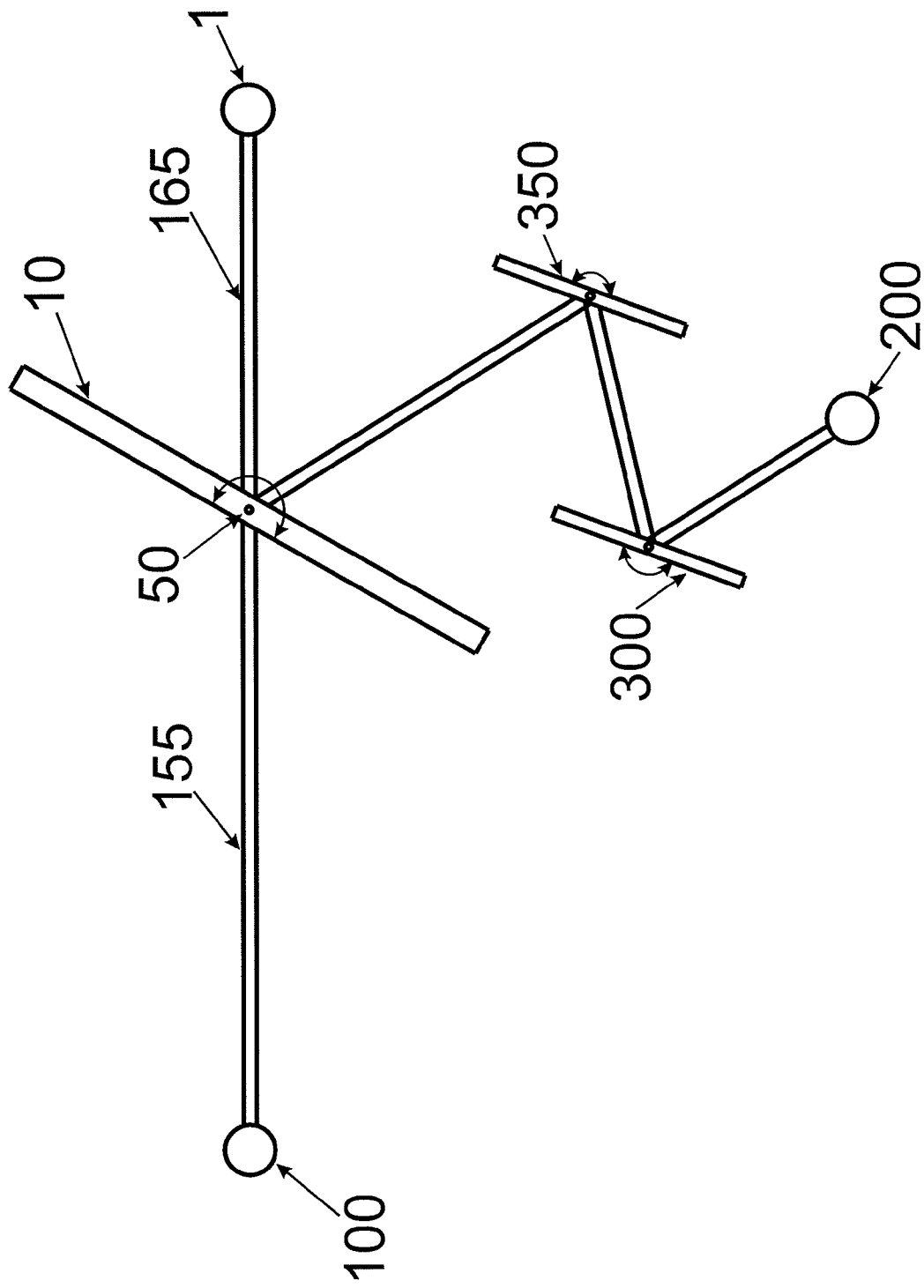
FIG. 3 is a schematic diagram of an alternate embodiment of the present invention.

Many arrangements may be used to independently adjust the angle of light 255 relative to filter 25a. For example, the entire assembly of light source 200 and collimating system 250 may be independently rotatable about axis 50. In another example, light source 200 may be fixed and the desired light path can be adjusted to the correct angle of incidence using a combination of rotatable mirrors, as shown in FIG. 3. Specifically, light from second light source 200 is reflected by first rotatable mirror 300 and then by second rotatable mirror 350 to attain the desired angle of incidence. While two mirrors are shown in FIG. 3 for illustrative purposes, the arrangement of the optical system for adjusting the angle of incidence of light from source 200 is a matter of design choice, and those skilled in the art will appreciate that other arrangements are possible.

Filter 25a will allow light from source 200 at the bandpass frequencies to pass through the filter rather than reflecting it. Nonetheless, the reflected light will be substantially "white" for purposes of illuminating the object so long as the range of frequencies that pass through the filter rather than being reflected is narrow, as is usually the case. The band of frequencies missing from light reflected off of filter 25a is a function of the angle of incidence, as previously described. Thus, filter 25a acts as a band rejection or band stop filter relative to the reflected light. If the angle of incidence of light on filter 25a from source 100 is the same as the angle of incidence from source 200, the bandpass and band stop frequencies will be the same. This property is useful in connection with further aspects of the present invention. For example, the goal of some experiments is cause object 1 to fluoresce in response to light of a particular wavelength. In an embodiment of the present invention, by using filter 25a as a band stop filter, as described, it is possible to illuminate the object with substantially white light while it is being prepared and manipulated, but which is lacking in the light frequencies that would cause the object to fluoresce. It is noted that by appropriately rotating the filter the band stop properties of the reflected light can be adjusted over a range of frequencies which need not be the same as the selected bandpass range used in the experiment.

In the event that an experimenter wants to illuminate object 1 with white light that is not missing any frequency band, he or she can use both light sources 100 and 200 simultaneously. Again, assuming the angle of incidence from each source is the same, light frequencies missing from the reflected light from source 200 will be furnished by the transmitted light from source 100 because the bandpass and band stop frequencies are the same.

Figure 4:
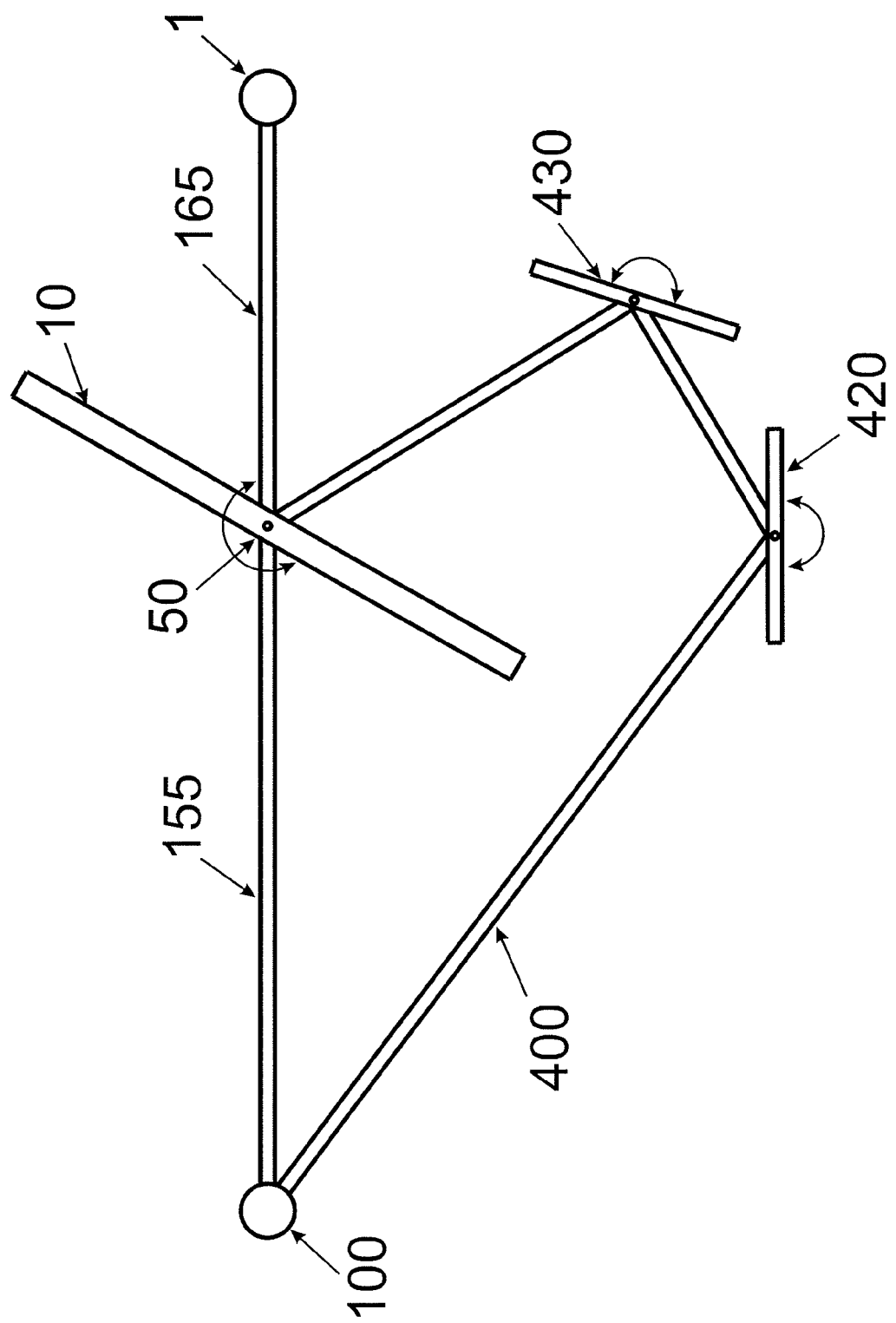
FIG. 4 is a schematic diagram of yet another embodiment of the present invention.

In another, less preferred, embodiment, depicted schematically in FIG. 4, a single white light source is used. In this embodiment, light from source 100 is used to provide a second beam of collimated light 400, which is directed around filter wheel 10 where it is reflected off of the surface of filter 25a as previously described. While mirrors 420 and 430 are depicted schematically in FIG. 4 as an exemplary way of achieving this result, there are many ways of arranging appropriate optical elements to attain this objective. The precise selection and arrangement of optical elements for directing light from source 100 to reflect off of the surface of filter 25a at the correct angle is a matter of design choice. For example, although FIG. 4 shows two separate beams of collimated light (155 and 400 respectively) emanating from source 100, a single collimated beam may be created using a single collimating system and thereafter divided into two beams using a beam splitter.

In another embodiment, each of the filters 25 on filter wheel 10 can be independently rotated to adjust its bandpass characteristics, such that it is not necessary to rotate the entire filter wheel to achieve the desired angle. This embodiment, while potentially space saving, is more complex, difficult to manufacture and expensive and, therefore, is less preferred.

Preferably, the present invention includes an overall control system comprising a combination of computer hardware and software to allow the user to control the light sources, rotate the filter wheel about its axes, rotate any mirrors, and otherwise control the elements of the present invention. Preferably, the control system may also be used to control additional elements used in the investigation, such as shutters, micromanipulators, stages, etc. that are not part of the present invention. Preferably, the control system further comprises a user friendly graphical user interface.

A method according to the present invention comprises collimating light from a first light source and directing the collimated light along a light path through a variable optical band pass filter mounted on a filter wheel rotatable about two axes. As described above the first axis is for rotating a selected filter into the path of the filter wheel, and the second axis is for adjusting the angle of incidence of the collimated light in order to obtain the desired bandpass. The filtered light is then directed to and illuminates an object of interest. The method further comprises reflecting white light from a second light source off of the surface of the bandpass filter onto the object to illuminate it with substantially white light. The first and second light sources are preferably different, but alternatively may be separate beams from the same light source. The light beam passing through the filter and the light beam reflected off of the surface of the filter may be "on" simultaneously, such that the object is illuminated by both beams at the same time, or at different times. The angle of incidence of the reflected light beam may be adjusted such that the reflected beam is missing a selected band.

Figure 5:
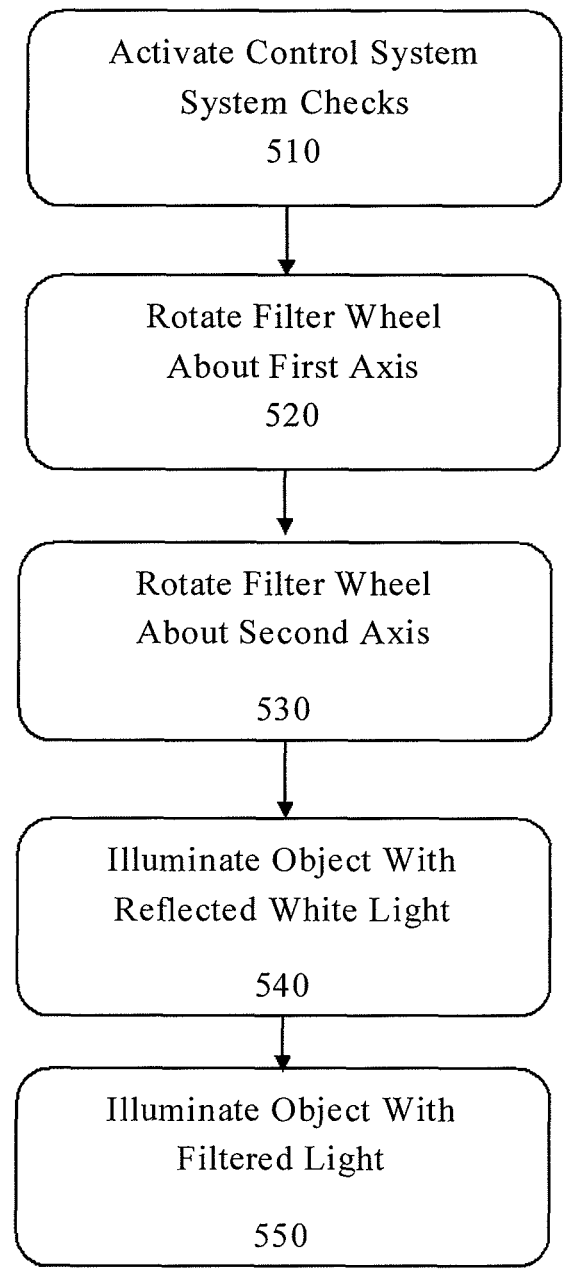
FIG. 5 is a flow chart depicting the steps of an embodiment of the method of the present invention.

FIG. 5 depicts a flow chart for implementing an embodiment of the method of the present invention. At step 510 the control system is activated and any initiation sequences and system checks are performed. At this point the researcher may input parameters and instructions for the experiment. At step 520 the filter wheel is rotated about a first axis to align a selected filter in the light path. At step 530 the filter wheel is rotated about a second axis to a desired angular position. At step 540 white light from a second light source is reflected off of the surface of the selected filter and onto the object under investigation. Although not considered part of the present invention, at this point the object may be aligned, manipulated, probed, dyed, adjusted, observed, photographed or otherwise handled as dictated by the needs of the investigation. These procedures are generally easier to perform under white light conditions. At step 550, the angular position of the filter wheel may be readjusted, if necessary, and collimated light from a first light source is passed through the filter to illuminate the object with a selected band of light. In most instances, the reflected white light used in step 540 will be turned off during all or part of step 550. Although not part of the method of the present invention, data observations related to the object as it is illuminated with filtered light will typically be made at step 550. Some or all of the steps may be repeated as necessary. Thus, it may be appropriate to illuminate the object again with reflected white light after data has been collected under filtered light, for example, to further adjust, manipulate or photograph the object. It is noted that while the flow chart of FIG. 5 sets forth a certain order of steps for exemplary purposes, it is not necessary that the steps be performed in the order indicated, and the order used in practice may be varied depending on the needs of the investigation. For example, it may be desired to illuminate the object first with filtered light (per step 550) and then with reflected light (per step 540).

The present invention has, thus far, been described in connection with a filter wheel comprising multiple filters that can be rotated into position. As a practical matter, this is understood to be the most useful application because the relatively large size of a filter wheel assembly makes it difficult to provide a secondary source of white light in a confined space. However, the invention more broadly encompasses the use of a rotatable filter (i.e., a filter that changes its bandpass frequencies as a function of the angle of incident light) both as a filter and as a source of white light. In the broader sense, the present invention embraces alternately, or simultaneously, illuminating an object with filtered light passing through a filter that has been rotated about an axis by desired angle, and with white light reflected off of the surface of the filter. This aspect of the invention is particularly useful, for example, when an experimenter desires to illuminate the object with white light that is missing a frequency band. This may be the case, for example, if the experimenter wishes to have the advantages, described above, of white light illumination, but without causing the object to be activated by a frequency that will cause florescence or other excitation.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

We claim:

1. An optical system comprising:
   a filter wheel rotatable about at least two axes and having a plurality of optical filters coupled thereto, at least one of said filters having a transmission band that varies with the angle of light incident on the filter,
   a first optical subsystem defining a first light path and arranged such that a beam of light from a first broadband light source passes through a selected one of said plurality of filters at a selected angle of incidence and the filtered light is directed to an object,
   a second optical subsystem defining a second light path and arranged such that light from a second broadband light source reflects off of a surface of said selected one of said plurality of filters and the reflected light is directed to said object,
   a control system for rotating said filter wheel about each of said at least two axes, and for controlling said first and second light sources, whereby a user can select to have said object illuminated by said filtered light or by said reflected light, or by both.

2. The optical system of claim 1, wherein said first and second broadband light sources are the same.

3. The optical system of claim 1 wherein said first and second light paths utilize the same filter angle, such that the object can be illuminated by transmitted filtered light or reflected light from said first and second light sources, respectively, without rotating the filter.

4. The optical system of claim 1 wherein the first and second optical subsystems are configured such that the reflected light is missing a frequency band that is substantially the same as the frequency band of the filtered light, whereby the object can be alternately illuminated by light within and outside of said frequency band.

5. The optical system of claim 1 wherein each of said plurality of optical filters has an elongate shape.

6. The optical system of claim 1 wherein said light beam is an inch or more in diameter.

7. A method of illuminating an object, comprising:
   collimating light from a first light source to form a beam,
   rotating a filter wheel having a plurality of filters coupled thereto about a first axis such that said collimated light beam passes through a selected one of said filters to illuminate an object with filtered light, said selected filter having a transmission band that depends on the angle of the light beam incident on said selected filter,
   rotating said selected filter about a second axis to adjust the transmission band of said incident collimated light beam, such that filtered light illuminates the object,
   reflecting light off of a surface of said selected filter such that said reflected light illuminates the object.

8. The method of claim 7 wherein said reflected light originates from a second light source.

9. The method of claim 7 wherein said reflected light originates from said first light source.

10. The method of claim 7 wherein the angle of said selected filter is changed when the filter is used to provide reflected light.

11. The method of claim 7 wherein the angle of said selected filter is held constant when the filter is used to provide reflected light.

12. The method of claim 7 wherein the reflected light is missing a frequency band.

13. The method of claim 12 wherein the missing frequency band is substantially the same as the frequency band of the filtered light.

14. The method of claim 7 wherein the object is simultaneously illuminated by filtered light and reflected light, such that no frequency band is missing from the illumination.

15. The method of claim 7 wherein the steps are performed by a control system based on user inputs.

* * * * *